Oct. 30, 1956 W. A. HYLAND ET AL 2,768,767
FERTILIZER DISTRIBUTOR
Filed May 28, 1954
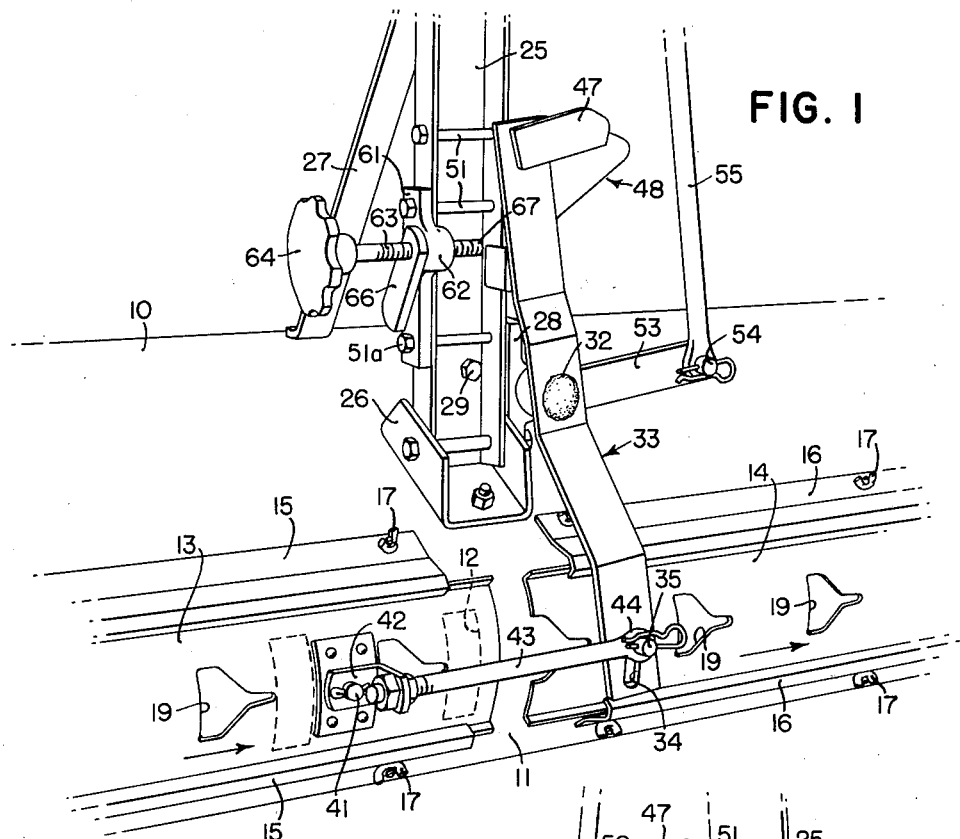
FIG. I
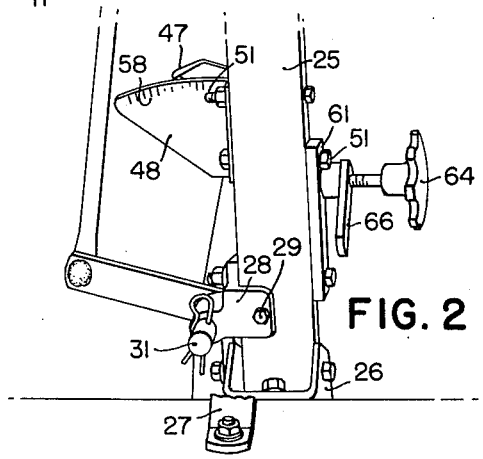
FIG. 2
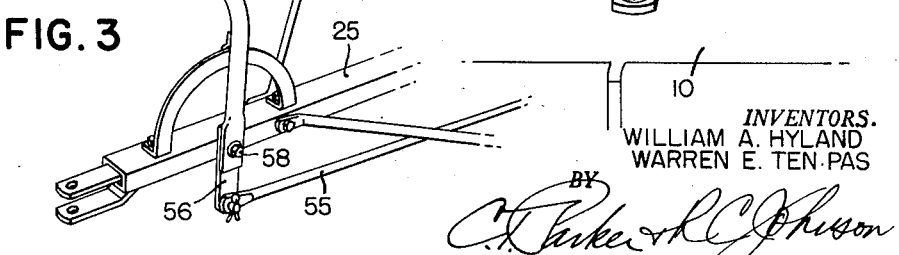
FIG. 3
INVENTORS.
WILLIAM A. HYLAND
WARREN E. TEN·PAS
BY
ATTORNEYS

United States Patent Office 2,768,767
Patented Oct. 30, 1956

2,768,767
FERTILIZER DISTRIBUTOR

William A. Hyland, Horicon, and Warren E. Ten Pas, Mayville, Wis., assignors to John Deere Van Brunt Company, Horicon, Wis., a corporation of Wisconsin Application May 28, 1954, Serial No. 433,092

4 Claims. (Cl. 222—47)

The present invention relates generally to agricultural implements and more particularly to distributors for spreading lime, fertilizer and other similar materials, generally in dry pulverulent condition.

The object and general nature of the present invention is the provision of flow-controlling and indicating means for fertilizer distributors, in which the flow indication is accurately secured through the minimum number of pivots and joints so as thereby to eliminate the undesirable effects of looseness in connecting linkage joints and connections between the indicator means and the part whose position it is desired to indicate.

More specifically, it is a feature of this invention to provide a pivoted member connected directly with the flow-controlling gate of the implement and carrying directly a pointer movable over an associated dial. Thus, with only two connections, one the pivot mounting of the member and the other the connection between said member and the gate, lost motion and looseness is substantially eliminated and the flow-controlling indications are rendered much more accurate than heretofore.

Another feature of this invention is the provision of an adjusting means of the screw-threaded type acting directly against the gate-controlling member, whereby very fine adjustments of flow may be secured, with accurate indications of the rate of flow.

These and other objects and advantages of the present invention will be apparent to those skilled in the art after a consideration of the following detailed description, taken in conjunction with the accompanying drawings, in which:

Fig. 1 is a fragmentary perspective view of the underside of a fertilizer distributor in which the principles of the present invention have been incorporated.

Fig. 2 is a fragmentary perspective showing the top portion of the parts illustrated in Fig. 1.

Fig. 3 is a fragmentary perspective view of the flow modifying lever that is arranged for manual operation.

Referring first to Fig. 1, the fertilizer distributor illustrated in the drawings is shown as including a hopper 10 having a lower portion 11 in which a plurality of openings 12, shown in dotted lines, are formed. A pair of gates 13 and 14 are movable along the bottom of the hopper 10 so as to control the flow of material through the openings 12, the gates 13 and 14 being held in place by removable flanged strips 15 and 16 connected to the hopper 10 by thumb nuts 17. Each of the gates 13 and 14 is provided with generally triangular openings 19 that cooperate with the openings 12 in controlling the flow of material from the hopper. In the preferred construction, the gates 13 and 14 are shiftable together along the flanged attaching plates 15 and 16 when changing the rate of flow.

A draft member 25 is connected to the front side of the hopper by a bracket 26 and an upper brace 27, whereby the draft member 25, which is in the form of a channel, forms a rigid part of the hopper 10. A support 28 is fixed to the left side of the draft member 25, as best shown in Fig. 2, and is securely fastened in place by a connecting bolt 29 or other suitable means. The support 28 forms means receiving a pivot member 31 that is fixed, as by welding at 32, to a lever 33 the rear end of which is slotted, as at 34, Fig. 1, to receive a pin 35 that is fixed to and forms a part of the left-hand gate 14. The pin 35 and slot 34 are so dimensioned that there is the required freedom for pivoting movement of the lever 33 relative to the gate 14, yet with minimum lost motion or looseness.

The other gate 13 carries a pin 41 similar to the pin 35 and mounted on the pin 41 is a connector 42 that is adjustably secured to the right end of a connecting rod member 43, the other end of which is in the form of an eye 44 and snugly but pivotally mounted on the pin 35. Thus, when one gate, such as the gate 14, is moved, the other gate is moved a like amount with minimum lost motion between the associated parts.

The end of the lever 33 opposite the slot 34 is provided with a pointer 47 that moves along a dial 48 fixed to the same side of the draft member 25 as the pivot-carrying support or bracket 28, as by a pair of bolts 51. An arm 53 is connected, as by welding, to the lever 33 so as to form a part thereof, the arm 53 carrying a pin 54 by which the rear end of a link 55 is pivotally connected to the lever 33. The forward end of the link 55 is pivoted to the lower end 56 of a hand lever 57 that, in turn, is pivotally mounted at 58 on the front end portion of the draft member 25. The dial 48 carries graduations 58, as best shown in Fig. 2.

The right side of the draft member 25 carries a bracket 61 that is secured to the draft member 25 by a bolt 51a and one of the bolts 51 mentioned above. The bracket 61 carries an interiorly threaded lug 62 in which an adjusting screw 63 is disposed, as best shown in Fig. 1. The outer end of the adjusting screw 63 carries a hand knob 64, and disposed on the member 63, between the knob 64 and the bracket 61, is a locking member 66. The inner end 67 of the adjusting member 63 is disposed in the path of movement of the forward end of the lever 33 and is thus adapted to act as a stop limiting the leftward movement of the gates 13 and 14, which is the direction indicated by the arrows in Fig. 1. The gates 13 and 14 may be moved in the other direction by forward movement of the operating handle 57, which causes rearward movement of the link or rod 55.

By virtue of the construction just described, very fine or minute changes in the rate of flow may be effected. All that it is necessary to do is to loosen the lock member 66 and turn the adjusting screw knob 64 in one direction or the other. Changes thus made will be indicated on the dial 58 by the pointer section 47. As will best be seen from Fig. 1, there is a minimum number of joints and connections between the gates and the adjustable stop member 63, and hence the minimum amount of looseness in these parts. This, as will be obvious, materially increases the accuracy of the flow control and the indications thereof on the dial 58.

While we have shown and described above the preferred details in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a fertilizer distributor, a hopper having a shiftable flow-controlling gate disposed along the bottom of the hopper, a draft member rigidly fixed to the hopper, a lever pivoted to said draft member at a point forward of said hopper and including a gate-shifting section extending underneath the hopper and connected to shift said gate, a pointer fixed to said lever, a dial fixed to said draft member and disposed adjacent the path of movement of a portion of said lever, stop means carried by said draft member and including an adjustable part disposed in the path of movement of one end of said lever and adapted to contact the latter directly and thus determine one position of the lever and the associated gate, and means operative to swing said lever away from said part.

2. In a fertilizer distributor, a hopper having a shiftable flow-controlling gate, a draft member rigidly fixed to the hopper along the bottom of the latter, a lever support fixed to said draft member, a lever pivoted to said support and having one end extended underneath the hopper and connected with said gate, a dial fixed to one side of said draft member, means movable with said lever and along said dial for indicating the position of said gate, a bracket fixed to the other side of said draft member and including a portion disposed in the plane of movement of a portion of said lever, a part adjustably mounted in said portion and having means adapted to be engaged directly by said lever for limiting the movement of the latter in one direction, and means for locking said adjustable part in a selected position of adjustment.

3. The invention set forth in claim 2, further characterized by said adjustable member comprising a screw-threaded part having threaded connection with said bracket, and a locking member mounted on said screw-threaded portion and adapted to be moved into locking engagement with said bracket to retain said adjustable member in a selected position.

4. In a fertilizer distributor, a hopper having a shiftable flow-controlling gate along the bottom of the hopper, a draft member rigidly fixed to the hopper at the forward side thereof, a lever pivoted to said draft member at a point adjacent the forward side of said hopper and disposed at the lower side of the draft member, said lever being movable about a generally vertical axis and having one end extending generally rearwardly to a point underneath the hopper and connected to shift said gate, a pointer fixed to said lever and extending generally along the lower portion of the draft member to a point adjacent one side of the draft member, a dial fixed to said draft member at said one side thereof and disposed adjacent the path of movement of said pointer, stop means carried by said draft member generally at the other side of the draft member and including an adjustable part disposed in the path of movement of a portion of said lever and adapted to contact the latter directly and thus determine one position of the lever and the associated gate, and means operative to swing said lever away from said part.

References Cited in the file of this patent

UNITED STATES PATENTS

| | | |
|---|---|---|
| 82,853 | Lowth et al. | Oct. 6, 1868 |
| 233,009 | Outcalt et al. | Oct. 5, 1880 |
| 435,691 | Freeman | Sept. 2, 1890 |
| 2,624,492 | Seltzer | Jan. 6, 1953 |
| 2,661,124 | Ajero | Dec. 1, 1953 |
| 2,678,145 | Juzwiak et al. | May 11, 1954 |